United States Patent [19]

Sekoulov et al.

[11] 4,113,613
[45] Sep. 12, 1978

[54] METHOD OF IMPROVING THE OPERATION OF BACKWASHABLE FIXED BEDS FORMED OF GRANULAR MATERIALS

[75] Inventors: Ivan Sekoulov; Wolf-Rüdiger Müller, both of Stuttgart, Fed. Rep. of Germany

[73] Assignee: Sulzer Brothers Limited, Winterthur, Switzerland

[21] Appl. No.: 771,958

[22] Filed: Feb. 25, 1977

[30] Foreign Application Priority Data

Mar. 4, 1976 [DE] Fed. Rep. of Germany ....... 2608899

[51] Int. Cl.² .................... C02C 1/04; B01D 37/00
[52] U.S. Cl. .................... 210/17; 210/63 R; 210/80
[58] Field of Search .............. 210/32, 63 R, 80–82, 210/17, 18, 20, 73 S

[56] References Cited

U.S. PATENT DOCUMENTS

| 1,966,279 | 7/1934 | Behrman | 210/32 |
| 2,105,835 | 1/1938 | Krause | 210/63 R |
| 3,282,702 | 11/1966 | Schreiner | 210/64 |
| 3,705,098 | 12/1972 | Shepherd et al. | 210/63 R |
| 3,932,278 | 1/1976 | Meidl et al. | 210/80 |

FOREIGN PATENT DOCUMENTS 1,389,530  4/1975  United Kingdom ....... 210/32

*Primary Examiner*—Thomas G. Wyse
*Attorney, Agent, or Firm*—Werner W. Kleeman

[57] ABSTRACT

A method of improving the operation of backwashable fixed beds formed of granular materials and used during purification of waste water of sewage or during water treatment, wherein the fixed bed is conditioned during a last step of the backwashing operation by filling the fixed bed with a liquid for a predetermined time duration. The liquid contains distributed as uniformly as possible therein at least one substance which in the presence of a catalytically triggered decomposition reaction gives off a gaseous component and thereafter the liquid to be treated is filtered.

14 Claims, 1 Drawing Figure

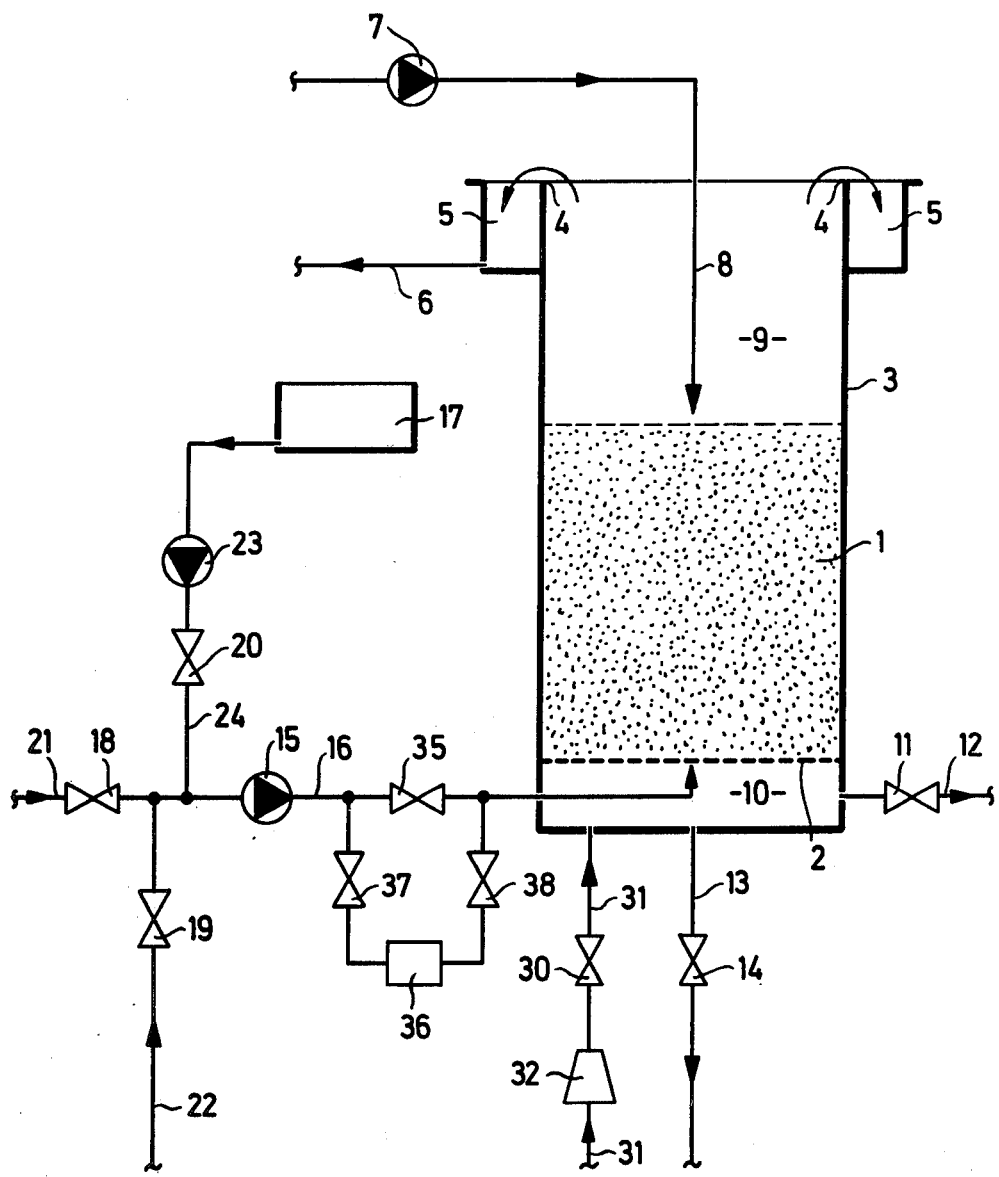

4,113,613

METHOD OF IMPROVING THE OPERATION OF BACKWASHABLE FIXED BEDS FORMED OF GRANULAR MATERIALS

BACKGROUND OF THE INVENTION

The present invention relates to a new and improved method of improving the operation of backwashable fixed beds formed of granular materials and which are typically employed during the purification of waste water of sewage or during water treatment. Examples of the aforementioned fixed beds are, for instance, sand filters, activated carbon-adsorbers and ion exchangers.

In the context of the disclosure of this invention, the term "backwashing" or "backflushing", when used and where appropriate, is employed in its broader sense to embrace not only flow of the flushing liquid counter-current to the treated liquid but also substantially in the same direction of flow thereof.

SUMMARY OF THE INVENTION

It is a primary object of the present invention to provide a new and improved method of improving the operation of backwashable fixed bed-filters formed of granular materials by subjecting the fixed bed to an extremely simple yet efficacious backwashing treatment.

Another and more specific object of the present invention aims at improving water purification with backwashable fixed beds composed of granular materials, and particularly, for instance during filtration of waste water, prolonging the life or operating time of the fixed bed-filter.

It is another significant object of the present invention to improve the operation of fixed bed-filters formed of granular materials, wherein, especially when filtering waste water by way of example, it is possible to completely or at least partially eliminate the anaerobic bacteria which usually are present and accompanying the filtration operation which is being performed in the fixed bed-filter, and thereby reducing the formation of so-called mud balls and the like, and thus, appreciably simplifying filter backwashing.

Now in order to implement these and still further objects of the invention which will become more readily apparent as the description proceeds, the invention contemplates conditioning the fixed bed-filter during a last step of the backwashing operation by filling the fixed bed filter for a predetermined time duration with a liquid, for instance a $H_2O_2$-solution, which contains as uniformly distributed as possible therein at least one substance which in the presence of a catalytically triggered spontaneous decomposition reaction releases a gaseous component, for instance $O_2$, and thereafter the filtering operation is begun.

During the decomposition reaction relatively large quantitites of energy are released spontaneously. The released energy promotes the formation, enlargement and migration of gas bubbles which, in turn, loosens or breaks-up the filter bed i.e. fixed bed-filter and results in deposition of gas bubbles at the granular filter material. Consequently, the fixed bed-filter is "aerated" or made more pervious in the manner of a dry filter. A dry filter, as is known, is a filter where the water to be filtered, during simultaneous passage of air through the filter in the same direction of flow or in counter-current flow, is applied in the form of atomized or sprayed droplets to the filter bed. The effect of such loosening of the fixed bed and the deposition of the gas bubbles or particles at the granules thereof is to promote, during subsequent filtration, deep penetration of the suspended solids in the water and which are to be held back into the fixed bed-filter. Hence, during the first part of the duration of a filtering operation, during which, for instance, the $O_2$ bubbles are not yet consumed by microbiological processes and/or have not yet disappeared by virtue of dissolving processes, there is obtained a deep bed filter effect resulting in improved utilization of the sand bed or other fixed bed, and thus, in a prolongation of the service life or operating time of the filter.

The loosening of the bed and the adhesion of gas to the granules, which effects are realized when practicing the invention, therefore in the first instance are of a mechanical and physical nature. The expression "spontaneous reaction" as used in conjunction with the disclosure of the present invention can be explained in terms of the fact that the reaction occurs while suddenly releasing such energy that both of these effects are realized. Observations have shown that visible effects of the decomposition reaction after filling the fixed bed-filter with the liquid, which preferably may be a true solution or a colloidal solution in the case of solid or liquid substances which are insoluble in water, first occur after a certain time-delay, wherefore the desired effect cannot or can only be obtained to an inconsequential degree when operating with throughflow conditions i.e. where the backwashing liquid flows directly through the fixed bed.

The time duration during which the solid bed-filter must remain filled with the liquid in order to allow the catalytically triggered decomposition reaction to go to completion, must be experimentally determined and is different from filter to filter. It amounts to typically, for instance, 10 minutes. However, it depends upon the nature of the granular mass which is contained in the fixed bed-filter and the possibly present microbiological growth as well as upon the nature of the infed spontaneously reacting substance. This substance is advantageously a peroxide, especially hydrogen peroxide ($H_2O_2$), a nitrate, but also may be a perborate or a percarbonate. An adequate expiration of the time duration can be checked in a very simple manner, for instance in that following disappearance of visible spontaneous reactions there is supplied into the filled filter bed or fixed bed-filter a catalyst for the decomposition reaction. If there has not occurred any rejuvenation of the gas-delivering reaction, then it is possible to immediately begin with the filtration operation.

If there is selected for the spontaneous decomposition a substance which gives-off oxygen, then due to the $O_2$-bubble formation in the filter bed an oxygen supply is collected which, in turn, leads to the beneficial results that for a certain period of operation of the filter the oxygen requirement of the fixed bed-filter is satisfied by this gaseous oxygen supply which remains in the pores or interstices of the fixed bed-filter. As a result, the activity of the desirable aerobic microorganisms is enhanced. Triggering of the decomposition reaction can be again accomplished either by catalytically effective substances present in the filter — for example, by enzymes, the aerobic microorganisms which remain in the filter even during pronounced backwashing thereof and which coat the sand granules or grains in the form of a fine biological film — or by the external addition of a catalyst which, for instance, may be constituted by manganese dioxide ($MnO_2$) or iron, which is admixed into the filter bed in the form of granular material.

Since directly following the step of conditioning of the fixed bed-filter there occurs the filtration operation, it is particularly important, under circumstances, during this method step that — especially in the drinking water treatment practice — there does not occur any impermissible loading of the filter with residual products of the decomposition reaction. Therefore, it has been found to be particularly advantageous for the conditioning of the fixed bed-filter to use hydrogen peroxide as the spontaneous decomposing substance. Hydrogen peroxide decomposes into water and oxygen without the need to add additional foreign ions or molecules to the filter bed. If aerobic microorganisms which are present in the filter bed should not be damaged or destroyed, then the concentration of the hydrogen peroxide is advantageously maintained to be less than 3% by weight. Good results have been achieved with concentrations down to about 0.05% by weight. The employed $H_2O_2$ concentration is to be coordinated, among other things, with the diameter of the granules present in the fixed bed-filter

BRIEF DESCRIPTION OF THE DRAWING

The invention will be better understood and objects other than those set forth above, will become apparent when consideration is given to the following detailed description thereof. Such description makes reference to the annexed drawings wherein the single FIGURE schematically illustrates a downward flow-sand bed filter together with the components of the installation which are required for carrying out the novel backwashing method of the invention.

DETAILED DESCRIPTION OF THE PREFERRED EMBODIMENTS

Describing now the drawing, the fixed bed-filter will be seen to comprise a sand bed 1 which, for instance, is supported upon a conventional filter bottom or nozzle floor 2 within a suitable vessel or basin 3. At the upper edge of the basin 3 there are provided overflow edges or weirs 4 or equivalent structure leading to collecting troughs or chambers 5 for the backwashing water. A withdrawal line 6 for the backwash water leads away from the collecting troughs 5 and which, for instance, itself can be subjected to treatment or otherwise used.

The supply of the fixed bed-filter 1 with the raw water or other influent to be filtered is accomplished with the aid of a pump 7 by means of an infeed line or conduit 8 which delivers such influent into the water chamber 9 which is located above the fixed bed-filter or filter bed 1. Below the nozzle floor 2 there is arranged a collecting chamber 10 for collecting the purified water which flows downwardly through the filter bed 1. The filtered water is removed from the chamber or compartment 10 by means of a purified water conduit or line 12 which can be closed by any suitable shut-off element 11, typically a valve.

A floor outlet or discharge line 13, which can be closed by a shut-off element 14, again for instance a valve, serves to withdraw, for instance at the end of a predetermined filtration time, water which is still impure and does not fulfill the requirements placed upon the filtrate.

To carry out conventional backwashing operations, which as is well known are carried out with water, air or an airwater mixture, the illustrated embodiment of equipment is provided with an air conduit or line 31 equipped with an adjustable throttle element 30 which can be shut-off, through which air delivered by a compressor 32 is sucked-up and forced under pressure into the chamber or compartment 10.

By means of a controllable backwashing pump 15, it is possible to deliver simultaneously, previously and/or subsequent to the aforediscussed infeed of air, flushing water by means of the line or conduit 16 to the filter bed 1, and also a conditioning liquid for conditioning the filter as contemplated by the invention or a liquid catalyst, for instance the enzyme known as catalase, which is stored in a storage container or vessel 17. Thus, with the throttle or shut-off element 18 open and the closable throttle elements or valves 19 and 20 closed the pump 15 withdraws backwashing water only from the conduit or line 21, or else, with the element 19 open and the shut-off elements or valves 18 and 20 closed, the pump withdraws liquid containing the spontaneous decomposing substance out of the conduit or line 22 e.g. a 0.3%-hydrogen peroxide solution. The liquid is delivered to the conduit or line 22 in a concentration which is already suitable for filling the filter bed or fixed bed-filter 1. Of course, it is however also possible to at least partially simultaneously open both of the adjustable throttle or valve elements 18 and 19 and to dose the substance delivered in concentrated from by the line or conduit 22 into the backwashing water stream, if desired with the aid of a not particularly illustrated conventional dosing device.

As already mentioned, the container 17 contains a liquid catalyst, for instance the aforementioned catalase, if there is used as the liquid a hydrogen peroxide solution. This catalyst is conveyed by means of a dosing pump 23 and, with the valve 20 open and the lines 21 and 22 closed by the associated valves or throttle elements 18 and 19, by means of the conduit or line 24 to the suction side of the pump 15 and from that location dosed into the liquid filling of the filter bed 1. This additional additive of catalyst is undertaken in the event that the composition of the filter bed and/or the microorganisms contained therein and their enzymes are not capable of triggering the spontaneous decomposition reaction or not capable of accelerating such decomposition reaction in a manner as needed for the sudden release of the gas bubbles. Of course, it is also possible to introduce the catalyst in a different manner directly into the filter bed which is filled with the liquid as previously discussed, for instance from the top or into the middle of such filter bed. In this regard, there is to be observed, among other things, the close correlation between the concentration of the solution to be infed and the grain size of the sand bed.

If catalase and/or spontaneous reacting substances are introduced in a concentrated state, then for the purpose of improving the admixing of these substances with the backwashing water a static mixing element 36 located at a bypass to a shut-off element 35, such as a valve, of the conduit or line 16 can be brought into operative association with the backwashing stream by opening the shut-off elements 37 and 38 and simultaneously closing the shut-off element 35.

The backwashing operation contemplated by the novel method of the invention and which, as mentioned, also can be employed with conventional backwashing of the fixed bed-filter proceeds in the following manner, wherein it is to be noted that in the example herein given the liquid containing the decomposing substance is present in an aqueous solution containing about 0.3% by weight hydrogen peroxide.

The preceding backwashing operation encompasses, by way of example, the respective steps, each lasting several minutes, of backwashing with air, an air-water mixture and with water, which, as is conventional, occur with different velocities amounting up to about 100 m/h. Following the backwashing of the filter bed with water at a velocity of about 50 m/h, which occurs as the last step, and before again placing the fixed bed-filter into operation, the filter bed is conditioned in the described manner. Owing to the dry filter effect there is beneficially obtained a prolongation of the filter operating time or service life and, furthermore, during part of its operating time an improved aerobic behavior in the filter bed.

Following the flushing-out of the deposits and impurities there is undertaken filling of the bed 1 with a $H_2O_2$-solution, which in this case, as mentioned, contains approximately 0.3% by weight $H_2O_2$, by placing into operation the backwashing pump 15 and opening the shut-off elements or valves 18 and 19. The time during which the bed 1 is filled with such solution or liquid amounts to approximately 10 minutes, during which there occurs a spontaneous decomposition reaction of the $H_2O_2$ into water and oxygen. This reaction is triggered by the enzymes furnished by the microbiological organisms and by the biological film or the like which has not been removed during the backwashing operation. Under circumstances, and as already mentioned, this reaction can be promoted by the addition of catalase or another suitable catalyst or completely triggered by such substances. Due to the subsequent addition of catalyst it is possible, as already explained, to check whether the reaction has gone to completion.

As mentioned, by virtue of the filling of the sand bed 1 and the reaction which takes place therein the latter is loosened and the formed gas bubbles adhere to the sand granules, so that there is achieved the described dry filter effect. This behavior is present for about 4 to 5 hours just as the aerobic behavior which is improved due to the oxygen which is bound at the granules, before the oxygen is ultimately consumed by the manifold microbiological processes occurring in the filter bed and by the oxygen consuming-suspended solids or particles additionally retained in the filter or sand bed 1. Upon renewed operation of the filter the filter resistance of a filter which has been treated according to the method aspects of the invention, at the start of operation is 50–60% greater due to the gas bubbles. As long as the gas bubbles are present in the filter this results in the deep bed filtration which has been described as the dry filter effect.

The conditioning of the filter according to the invention is of course not limited to the described exemplary embodiment of a filter, rather also can be employed in the case of adsorbers and ion exchangers. Furthermore, it is not limited to such beds through which the flow of the treated liquid, during operation of the filter, occurs from the top towards the bottom, rather can be advantageously also employed with filters through which the liquid flow occurs in the upward direction. Finally, the method is not limited to the illustrated infeed of the conditioning liquid from below. The manner of supplying this liquid — and, when desired, the added catalyst — does not have any influence upon the performance of the method.

Lastly, it is mentioned that details of techniques for further improving the backwashing of fixed beds formed of granular materials have been disclosed in our commonly assigned U.S. application Ser. No. 771,959 filed Feb. 25, 1977 entitled "Method Of Improving The Backwashing Of Fixed Beds Formed Of Granular Materials", to which reference may be readily had and the disclosure of which is incorporated herein by reference.

While there are shown and described present preferred embodiments of the invention, it is to be distinctly understood that the invention is not limited thereto, but may be otherwise variously embodied and practiced within the scope of the following claims.

Accordingly, what we claim is:

1. A method of improving the operation of backwashable fixed beds of granular material and employed in the purification of waste water or water treatment, comprising the steps of:
   a. cleaning the fixed bed by backwashing at the conclusion of purification;
   b. conditioning the cleaned bed prior to placing it onstream for filtration, and conditioning step being carried out by filling the fixed filter bed with a liquid containing hydrogen peroxide in an amount effective to release gaseous oxgyen;
   c. contacting said hydrogen peroxide containing liquid with a catalyst capable of spontaneously reacting with said hydrogen peroxide to release gaseous oxygen as a decomposition product; and
   d. placing the conditioned filter bed onstream for filtering waste water to be purified.

2. The method as defined in claim 1 wherein said filter bed is employed for biologically purifying said waste water, said conditioning step being carried out in a manner wherein the growth of aerobic microorganisms present in the filler bed is promoted while anaerobic microorganisms are partially destroyed.

3. The method as defined in claim 1 wherein said hydrogen peroxide concentration is less than 3% by weight.

4. The method as defined in claim 1, further including the step of:
   utilizing a catalyst present in the fixed bed for promoting the decomposition reaction of the liquid filled into the solid bed.

5. The method as defined in claim 4, wherein: said catalyst is an enzyme.

6. The method as defined in claim 5, wherein: said enzyme is catalase.

7. The method as defined in claim 4, wherein:
   said catalyst is contained in microbiological film coated granules of the fixed bed.

8. The method as defined in claim 1, further including the step of:
   adding a catalyst for promoting the decomposition reaction of the liquid filled into the fixed bed.

9. The method as defined in claim 8, wherein: said catalyst is an enzyme.

10. The method as defined in claim 9, wherein: said enzyme is catalase.

11. The method as defined in claim 1, further including the step of:
    utilizing at least one catalyst present in the fixed bed for at least triggering the decomposition reaction of the liquid filled into the fixed bed.

12. The method as defined in claim 1, further including the step of:

adding at least one catalyst for at least triggering the decomposition reaction of the liquid filled into the fixed bed.

13. The method as defined in claim 1, wherein:
said fixed bed comprises an activated carbon adsorber which is conditioned once each day for maintaining the aerobic properties thereof.

14. The method as defined in claim 1, wherein:
said fixed bed is an ion exchanger which is conditioned once each day for maintaining the aerobic behavior thereof.

* * * * *